United States Patent [19]

Richer

[11] 4,351,023
[45] Sep. 21, 1982

[54] PROCESS CONTROL SYSTEM WITH IMPROVED SYSTEM SECURITY FEATURES

[75] Inventor: Donald K. Richer, Mansfield, Mass.

[73] Assignee: The Foxboro Company, Foxboro, Mass.

[21] Appl. No.: 139,495

[22] Filed: Apr. 11, 1980

[51] Int. Cl.³ .................. G06F 15/46; G06F 11/16
[52] U.S. Cl. ................................. 364/187; 364/134; 371/9
[58] Field of Search ........ 364/101, 102, 119, 131–136, 364/184–187; 371/8, 9

[56] References Cited

U.S. PATENT DOCUMENTS

| | | | |
|---|---|---|---|
| 3,303,474 | 2/1967 | Moore et al. | 371/9 X |
| 3,377,623 | 4/1968 | Reut et al. | 364/100 X |
| 3,636,331 | 1/1972 | Amrehn | 371/9 X |
| 3,786,433 | 1/1974 | Notley et al. | 371/9 X |
| 4,123,794 | 10/1978 | Matsumoto | 364/119 X |
| 4,208,715 | 6/1980 | Kumuhara et al. | 371/9 X |

Primary Examiner—Joseph F. Ruggiero
Attorney, Agent, or Firm—Andrew T. Karnakis; Jack H. Wu

[57] ABSTRACT

A process control system includes two digital controllers each capable of exercising direct digital control over the process. One of the controllers is selected to be on-control, the other serving as a backup. A separate data buffer memory connected to both controllers stores the most recent static and dynamic data base of the on-control controller which is transferred to the backup controller. In the event of failure or other loss of service, the backup automatically acquires control with an up-to-date data base resulting in a smooth transition. Provisions are also included to have the backup controller examine the health of the on-control unit before deciding whether or not to accept the data buffer contents thereby reducing the likelihood of corrupted data being fed to the backup.

10 Claims, 7 Drawing Figures

PROCESS CONTROL SYSTEM WITH IMPROVED SYSTEM SECURITY FEATURES

FIELD OF THE INVENTION

This invention relates in general to process control systems. More particularly, this invention relates to computer based process control systems having a primary controller for direct digital control (DDC) of the process along with a back-up controller for performing DDC of the process in the event of a failure of the primary.

BACKGROUND OF THE INVENTION

With the advance of computer technology over the past several years, there has been a concomitant use of computers in the automatic control of industrial processes. However, due to the critical need for providing continuous, accurate control over most processes either because of the extreme volatility of the finished product or because of the desire for greater efficiency and higher yields to offset the high cost of energy, there is a pressing need for enhanced security in DDC process control systems. Security as used herein refers to the ability of the system to provide automatic control under normal circumstances and to take corrective action in the event of abnormal occurrences such as occasional power interruption, component malfunctions and the like in the face of potential disturbances to the process.

Numerous techniques have been proposed over the years to improve the security aspects of these computer based process control systems. These include the provision of a backup controller available to take the place of the primary controller in the event of a failure (i.e., a redundant control system). Among the collection of patent art relating to such redundant control systems, there is included U.S. Pat. No. 3,636,331 (Amrehn) and U.S. Pat. No. 4,141,066 (Keiles).

Keiles discloses a process control system that includes a plurality of primary process controllers, with each having stored in its random access memory (RAM) configuration information that is compatible with the type of control function being performed by the particular controller. There is also disclosed a single backup controller arranged to be substituted for a failed primary. However, since Keiles' backup is not being used for monitoring and controlling the process, its RAM is devoid of any configuration information, and accordingly upon failure of a primary, the RAM of the primary controller is transferred to the RAM of the backup to allow it to assume the identity of the failed controller. Although not entirely clear from the disclosure, it does not appear that Keiles is concerned with automatically preserving dynamic (i.e., current process input/output values, results of time dependent calculations, etc.) state information in addition to the static (i.e., configuration) information. Furthermore, there is a high likelihood that the data base will be corrupted if controller failure occurs while updating this information.

Amrehn, on the other hand, proposes a system for controlling a chemical plant employing two identical computers whose control programs are subdivided into phases that correspond to operational phases of the chemical process. Although Amrehn's system purports to have backup capability which assumes control in the event of a breakdown of the primary control computer without producing any disturbance to the process, it suffers from some drawbacks and disadvantages. Particularly, if there is such a failure, the backup only takes over control by starting at the beginning of the program phase which had been processed by the failing computer. This requires that "phase breaks" be carefully designed by the end users of the system (i.e., process plant operating management), especially during batch process control, so that the total process will not be endangered.

Also, in Amrehn's system a system check module periodically reviews the status of the primary controller; and if a failure occurs, the check module merely connects the backup computer to the data bus by means of activating a switching mechanism which Amrehn refers to as the data flow gate. No provision is included in the backup determine the reliability of the data base (i.e., program phase change information) which was transferred by the failed primary just prior to switchover. As Amrehn points out, the last command of a phase can be altered or obliterated if the primary fails during a phase change.

It is also apparent that these prior art redundant control strategies, upon failure of the primary controller and during transfer to the backup controller can create a severe process "pump". These bumps can result in reduced efficiencies in the overall control of the process.

SUMMARY OF THE INVENTION

The present invention overcomes the foregoing limitations and disadvantages of the prior art by providing a process control system utilizing redundant controllers to provide improved security features such that during switchover the static and dynamic state of control is automatically preserved. In accordance with a preferred embodiment, the system includes two identical, redundant controllers each having the capability of providing direct digital control of the process. A director contains logic circuitry for resolving contentions between controllers for control of the process and for instituting switchover to the backup unit in case of a failure. A separate data buffer with associated memory located external to both controllers stores during each control cycle that most recent static and dynamic data base of the controller having control of the process.

Although shared by each controller, the buffer effectively decouples the two controllers both with respect to data base and control signals. During the same control cycle, provisions are included to have the backup controller read the contents of the data buffer. In this manner, the backup can in the event of failure automatically acquire control of the process with a data base that is up-to-date to within one sample time (i.e., control cycle). This results in a smooth transition, in effect a bumpless transfer.

In accordance with another important aspect of the invention, the backup unit can examine the health of the other controller before deciding whether or not to accept the data buffer contents. This reduces the likelihood of corrupted data from the failed controller being fed to the backup controller and hence further enhances the security of system operation.

BRIEF DESCRIPTION OF THE DRAWINGS

Other aspects and advantages of the present invention will become apparent from the following detailed description to be read in conjunction with accompanying drawings, wherein.

DESCRIPTION OF THE PREFERRED EMBODIMENT

Figure 1:
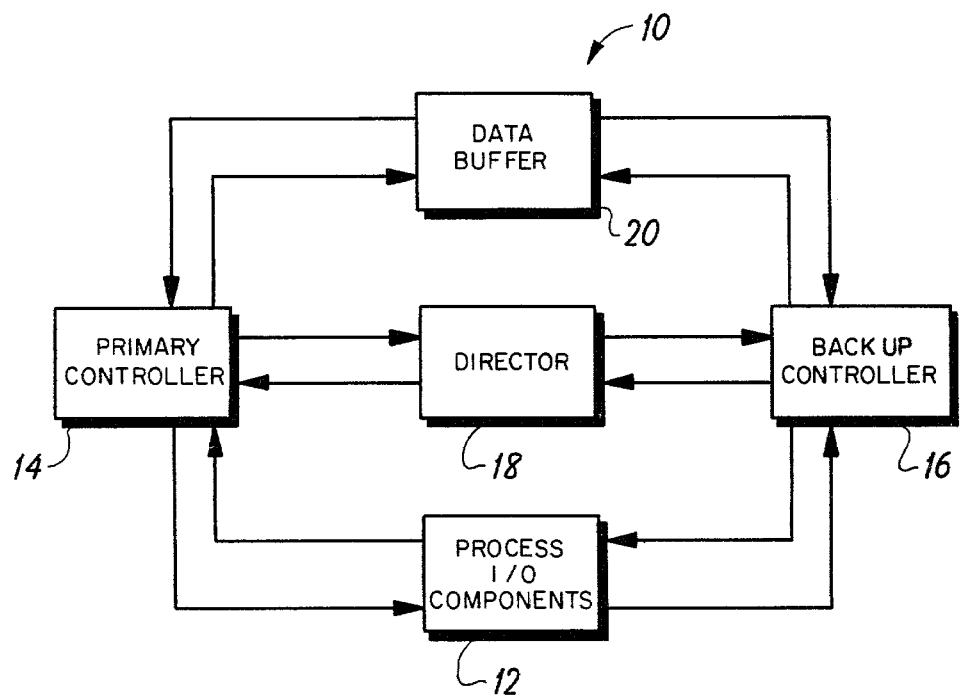
FIG. 1 is a block diagram of the presently preferred embodiment of the invention.

Referring to FIG. 1, there is shown a block diagram of a process control system 10 in accordance with the present invention for regulating a process via communication to and from process input/output components (e.g., sensors and operators), represented cumulatively by block 12. The system includes two identical, redundant controllers, one designated a primary controller 14 the other a backup controller 16, with each controller having the capability of providing direct digital control of the process. Digital controllers of this general type are well known in the art and may include a central processing unit (CPU), memory, and the usual interface circuitry. Also included as part of the system is a director unit 18 which contains contention logic circuitry for determining which of the two controllers is to be "on control", and a separate data buffer 20 shared by each controller.

The configuration thus described provides for a redundant process control system with a minimum of common circuitry so as to reduce the impact of a single component failure producing catastrophic consequences. Furthermore, as will be more fully described subsequently, automatic switchover to the backup control unit in the event of a malfunction or loss of service of the other controller occurs using static and dynamic process state information stored in the data buffer one control cycle before the switchover. Accordingly, the transition as viewed from the process is smoothly accomplished without any significant disturbances, i.e., bumpless transfer is enhanced.

Figure 2:
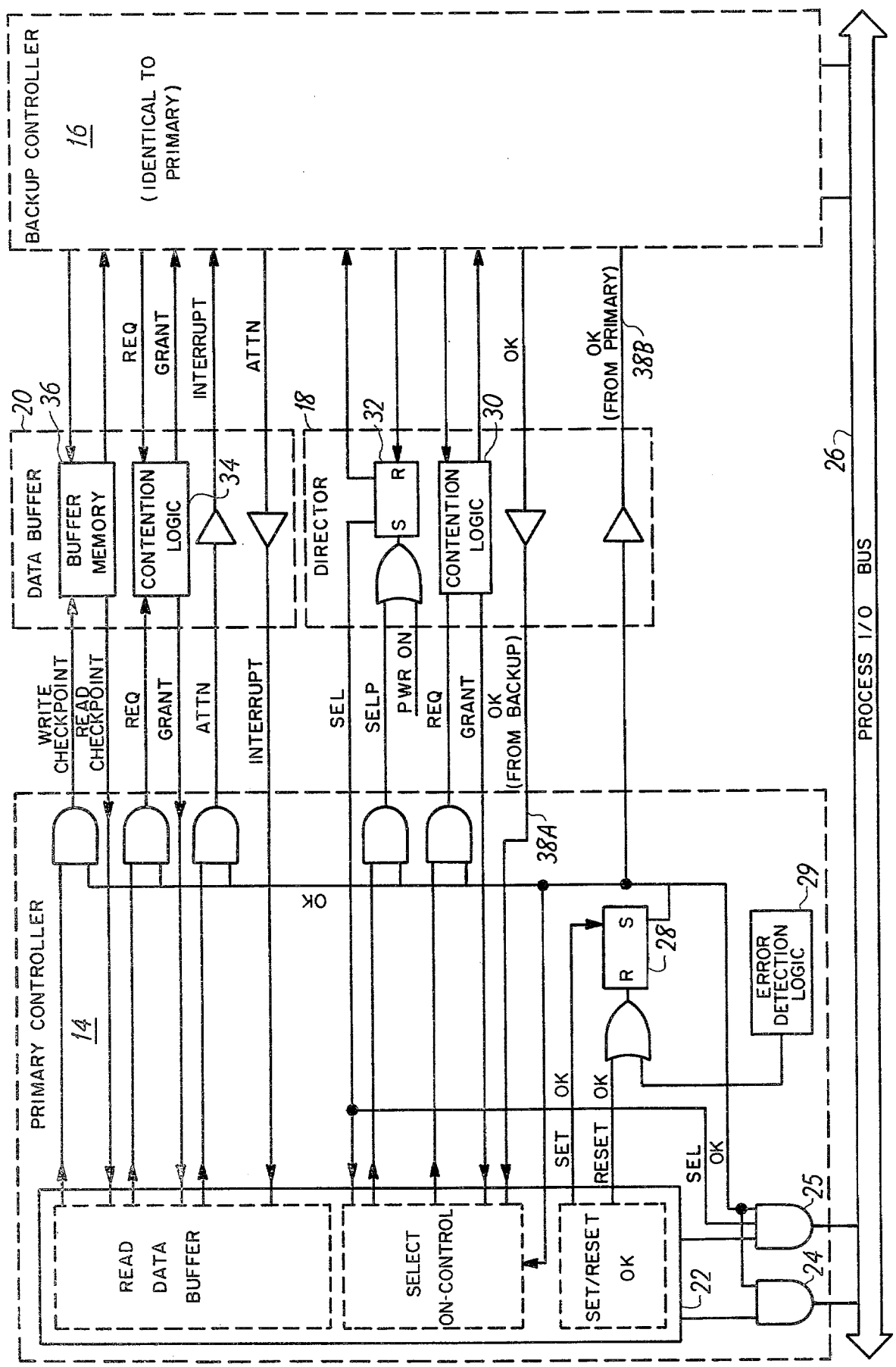
FIG. 2 is a more detailed description of the embodiment of FIG. 1.

To better understand the operation of the present system, attention is directed to FIG. 2 which shows in greater detail the units of the system and the signal flow therebetween. For the sake of clarity, only details of the primary controller 14 are shown, it being understood that all of the signals generated thereat are also found within the backup controller 16. The primary controller includes a CPU 22 providing the functions figuratively depicted as, READ DATA BUFFER, SELECT ON-CONTROL, and SET/RESET OK; a read enable gate 24 and a write enable gate 25 which allows the receiving and sending of signals along a process I/O bus 26; an OK latch 28; and self diagnostic controller checking capability illustratively presented as an error detection logic unit 29. The director 18 is primarily composed of a contention logic unit 30 and a "Select" latch 32, while the data buffer 20 has its own contention logic unit 34 and a buffer memory 36.

In order for a controller to read process I/O components, its OK latch 28 must be set. If the OK latch is not set, then the controller is totally gated off the bus 26, the director 18, and the data buffer 20. The OK latch is set under program control as part of a startup command and is usually reset by an output signal from the error detection logic unit 29. Error detection of this nature can take the form of hardware monitoring of power supply levels, timing out of certain timers, parity, etc., as well as software checks of sample computations and the like. In any event, diagnostic checking of this sort is well known in the field of digital processing and thus need not be explored in any further detail for the purposes herein. If both contollers are OK, the possibility exists for them to attempt to simultaneously read the bus. To prevent this from occurring a read contention logic unit 30 is included as part of the director. This logic is quite similar to that logic found in the data buffer to be subsequently described.

In order for a controller to write to process output components (and hence actually be on-control), it must, in addition to having its OK latch 26 set, be selected as evidenced by the receipt of a SEL signal from the Select latch 32. A controller requests that it be selected by issuing a select pulse (SELP). It will be appreciated that the control of SELP pulses from each controller is handled through one flip-flop, the Select latch 32. Since the select bits are determined from complementary outputs of this flip-flop, one and only one of the controllers is ever selected.

Having thus described the SELECT operation, a discussion of the utilization of the data buffer 20 and its role in providing a system security feature that helps ensure safe process operation in the event of equipment malfunction and/or forced shutdown follows. The data buffer includes a 4K word memory 36 into which the static and dynamic data base of the primary controller 14 is dumped during every control cycle (e.g., once every half second). The location of a data buffer separate from each controller, yet electrically accessible by each provides distinct advantages in that both controllers are effectively decoupled from one another both in terms of data base and control signals, i.e., buffering in this manner prevents a failure of a control signal resident in one controller from tying up the memory of the other.

Figure 3:
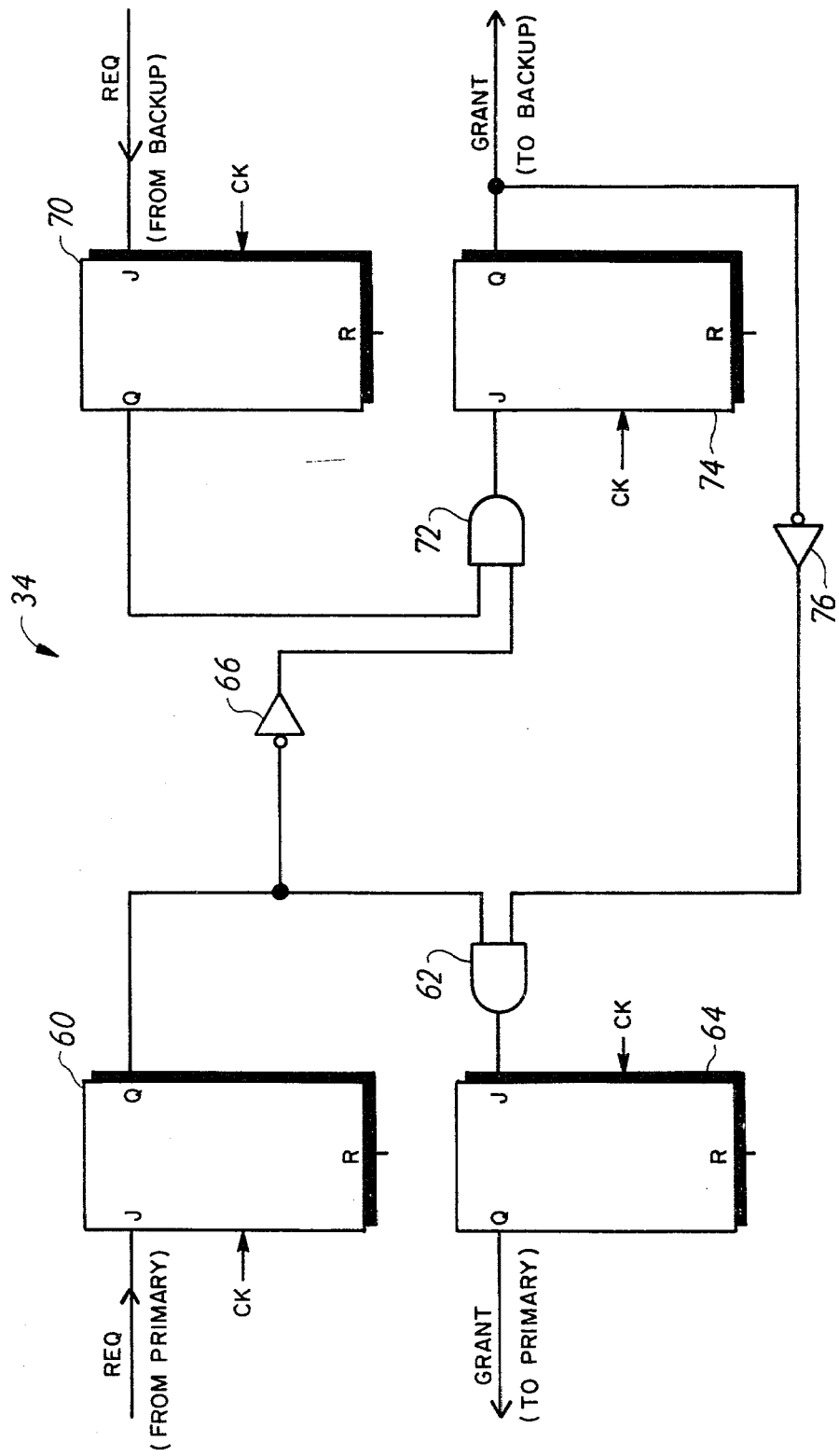
FIG. 3 is a logic diagram of the data buffer contention logic of the embodiment.

Since the data buffer 20 is shared, access for reading out of or writing into the buffer is resolved on a first-come-first-serve basis. Details of the contention logic unit 34 are presented in FIG. 3.

When the worst case condition occurs, both controllers simultaneously activate request (REQ) signals which are applied to J inputs of respective Request flip-flops 60 and 70. At the leading edge of the next pulse derived from a 10 MHz clock both Request flip-flop outputs will be activated, thereby enabling a gate 62 which permits a Grant flip-flop 64 with access to the primary controller 14 to be set. At the same time, the output of the Request flip-flop 60 is inverted by means of an invertor 66 and disables an input gate 72 of a Grant flip-flop 74 connected to the backup controller 16. During the next clock pulse, only the Grant flip-flop 64 output will be activated so as to issue a grant (GRANT) signal to the primary controller. Under this arrangement with the Grant flip-flop 74 gated off, only one GRANT is active at a time despite the fact that both REQ signals were issued simultaneously. After the primary controller terminates its command cycle, it resets its Grant and Request flip-flops. This now enables the gate 72, and in the manner discussed above the gate 62 now is disabled (see invertor 76). Following the logic through, it will be seen that a GRANT will be issued to the backup controller while at the same time the primary will not have an active GRANT.

Under the example being discussed (primary: on-control), a transfer of data bases from the primary to the buffer is initiated by the gated combination of OK and WRITE CHECKPOINT (refer to FIG. 2). After the transfer, the data buffer then allows the primary controller 14 to issue an attention (ATTN) signal which after suitable buffering is fed as an interrupt (INTERRUPT) command to the backup controller 16 signalling it that a new checkpoint is ready to be read (i.e., READ CHECKPOINT).

Under normal operation, the two controllers do not contend for the process I/O bus 26. The primary has total control of the process and the backup is in a tracking mode receiving as discussed above a "delayed copy" of the primary controller's most recent data base.

In accordance with an important aspect of the present invention, prior to switchover of control (as for example occurring during a failure of the primary controller) the backup controller can examine the "health" of the primary before deciding to accept a new data buffer input before assuming ultimate control. This substantially reduces the likelihood of a "sick" controller corrupting the data base of the other.

Figure 4:
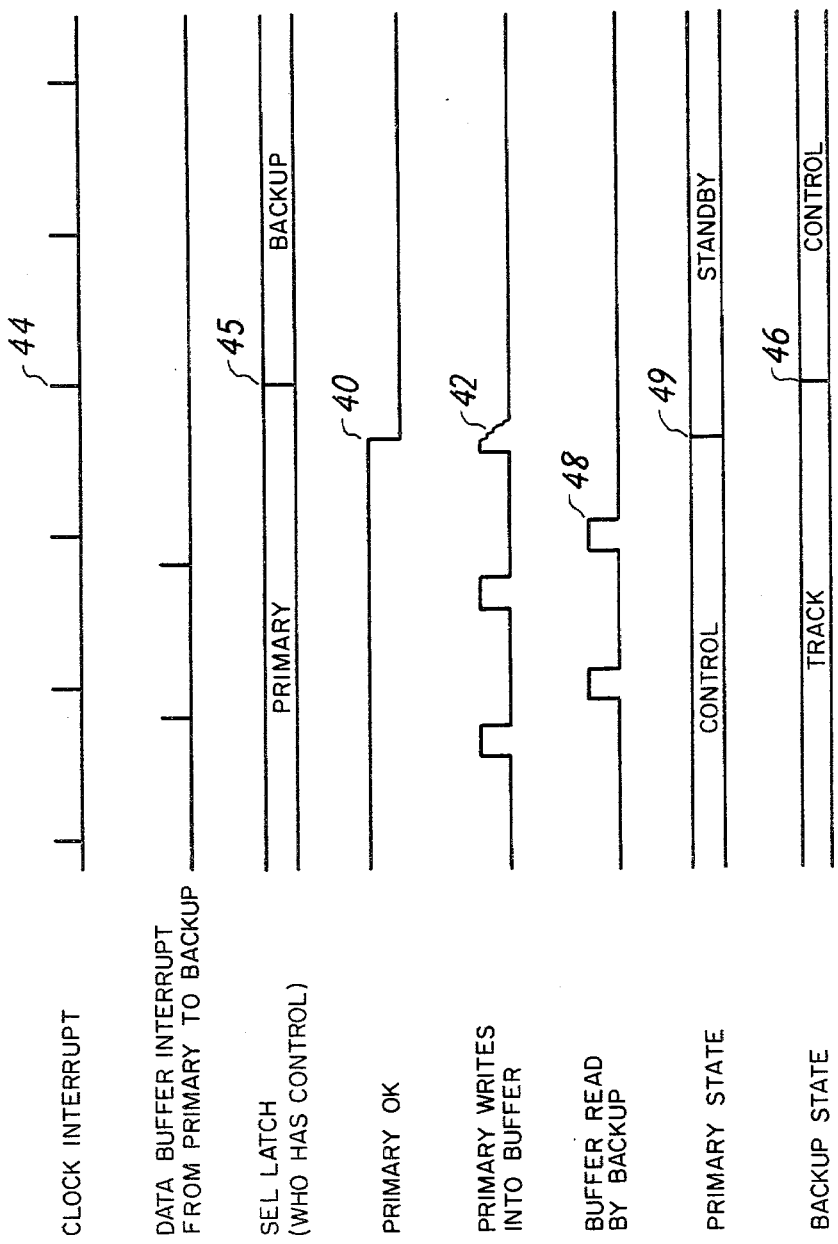
FIG. 4 is a timing diagram illustrating switchover from the primary controller to the backup controller, and also showing the various control states for the controllers.

Reference should now also be made to the timing diagram of FIG. 4 which shows at reference numeral 40 the resetting of the OK latch 28 resulting from a failure of the primary controller 14 occurring at a point in time coincident with the primary writing its now corrupted data base into the buffer 20, as represented by the decayed pulse 42. The resetting of the OK latch causes the backup controller 16 to select itself, in accordance with the procedures outlined below, at the beginning of the next clock cycle (see reference numerals 44, 45 and 46). Each controller has access to the status of the other because the respective OK signals of each are sent to the other over control lines 38A and 38B. Ordinarily the backup would take over control using the last data base it had copied from the buffer. However, since the primary failed in the middle of a data buffer write, the backup simultaneously receives an indication that the primary is not OK and hence will not accept the contents of the buffer. Instead the backup assumes control using the data base it copied the previous clock cycle (pulse 48). The primary controller remains in a "standby" state (reference numeral 49) for so long as the OK latch is reset. In this state the primary is not only prevented from writing to the process I/O bus 26, but also is unable to read process values or track the now controlling backup controller. Additionally no block processing of control algorithms and other data manipulation can occur while in standby.

Figure 5:
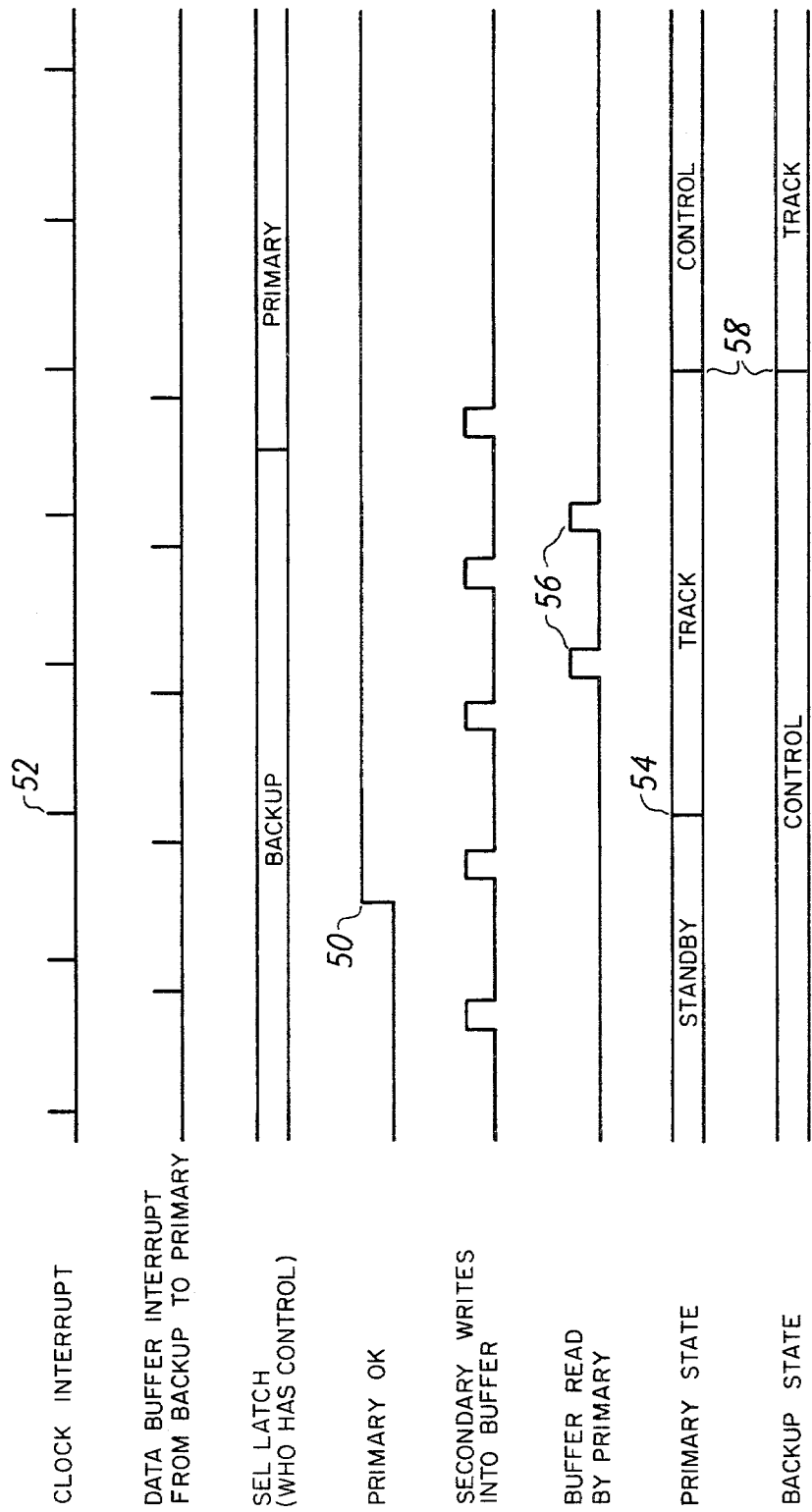
FIG. 5 is a timing diagram illustrating switchback from the backup controller to the primary controller, and also showing the various control states for the controllers.

The timing diagram of FIG. 5 shows the sequence of events for switching back to the primary controller 14 after it has been repaired. After repair, the OK latch 28 of the primary is set (reference numeral 50) either manually or via an external startup command received from a host computer (not shown) which provides higher level supervision over the system. On the next clock cycle 52, the primary enters its tracking state (reference numeral 54) and begins accepting the reading the contents of the data buffer 20 being written by the backup controller 16 as indicated by pulses 56. If it is desirable to have the primary controller (whose designation as "primary" is only one of nomenclature as both controllers are identical) regain control after a while, this must be initiated either manually or through an external switchover command from the host computer to force the backup off control since it is still OK and selected. This occurs at point 58 with the primary going on control using the last data base it copied from the backup. The backup then begins tracking the primary as before.

Figure 6:
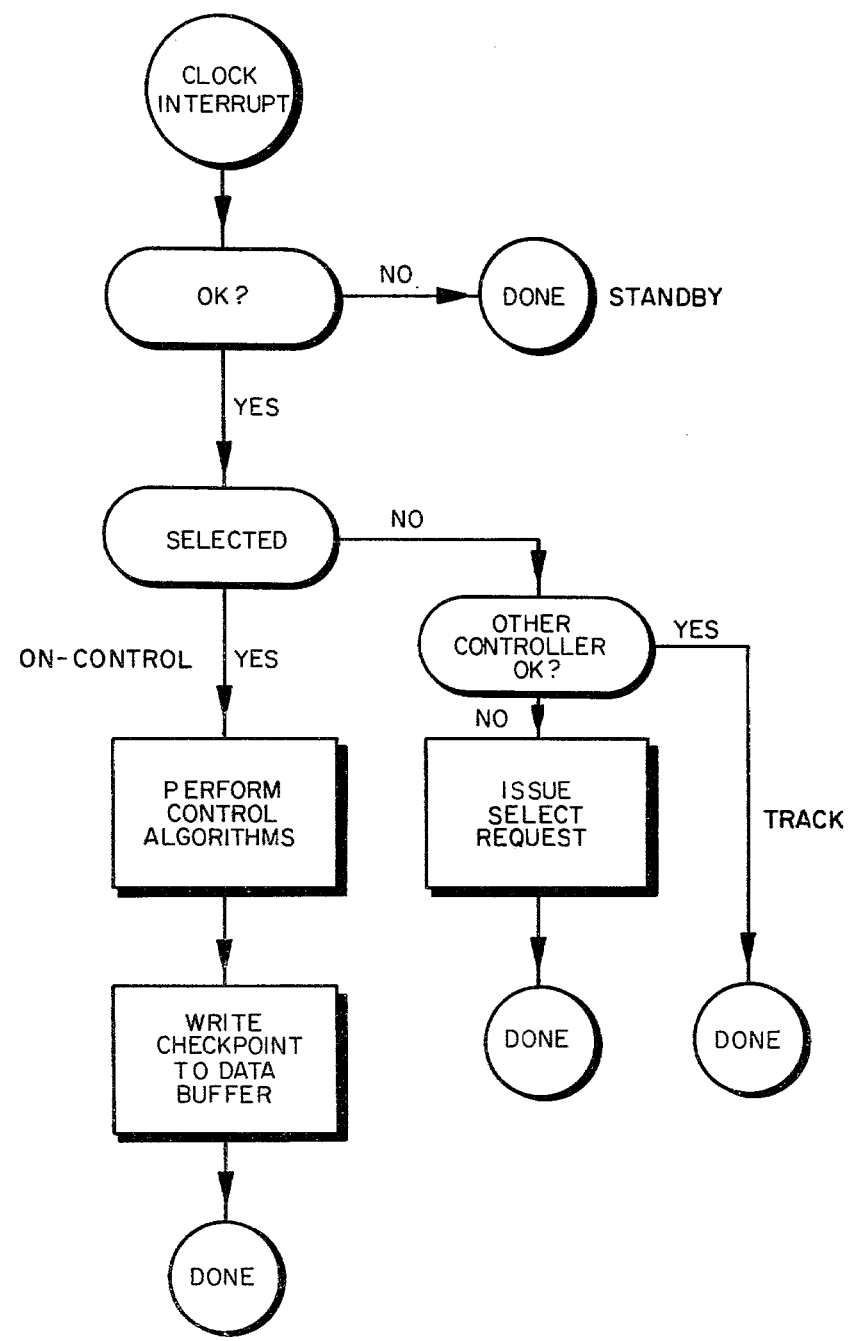
FIG. 6 is a flowchart of the periodic routine for selecting a controller to control the process.
Figure 7:
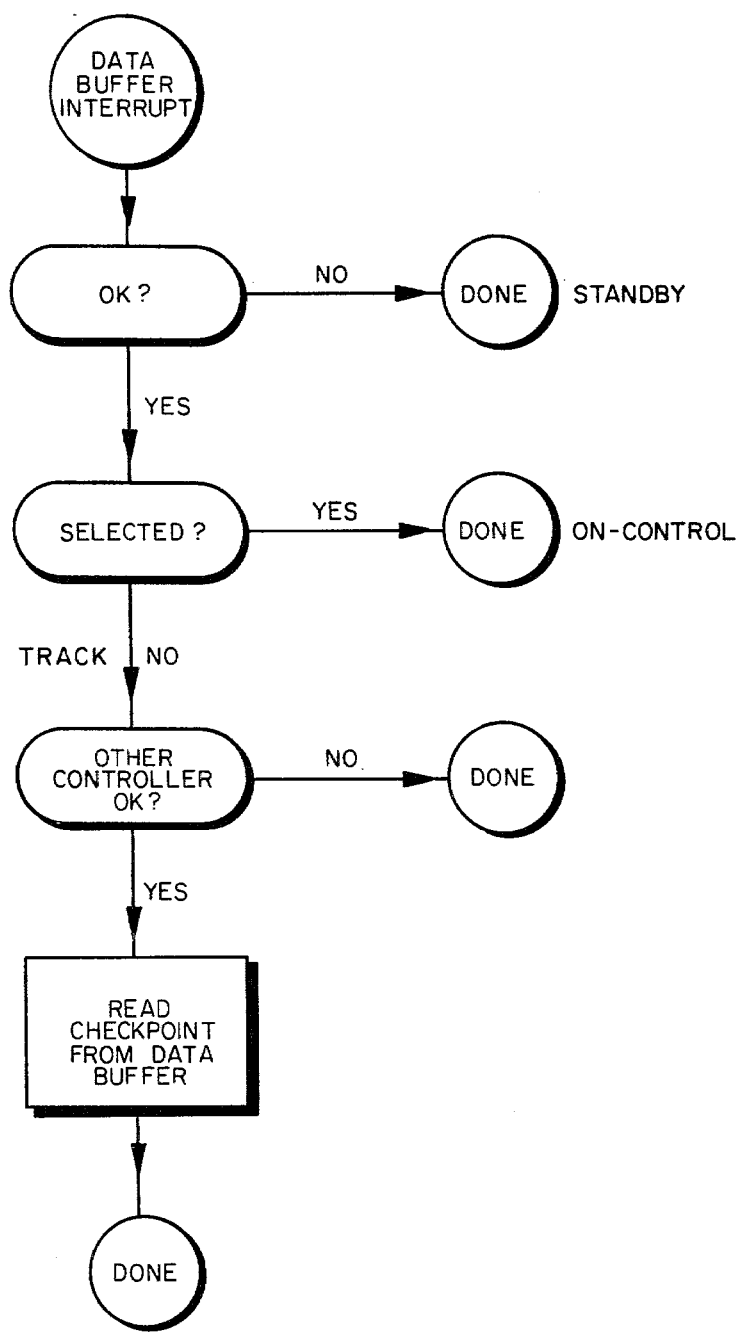
FIG. 7 is a flowchart of the periodic routine for deciding whether or not to read data from the data buffer.

The flow charts of FIGS. 6 and 7 further show how a controller moves from state to state. FIG. 6 focuses on the periodic sequence for selecting the appropriate controller to control the process. In the embodiment being described, processing begins every half second when the controllers receive a clock interrupt. The system has a single clock and both controllers receive this interrupt simultaneously. If OK is not set, the controller goes into its standby state. If the Select latch 32 is not set, and the other controller is OK, the controller goes to the tracking state. On the other hand, if the other controller is not OK, then the controller knows it should take over control and accordingly issues a Select Pulse and on the next clock interrupt finds itself selected and goes to the on-control state from which it is able to perform block processing of control algorithms and the like.

After the on-control controller completes its block processing, it transfers its data base to the data buffer 20 and interrupts the other controller. The flow chart of FIG. 7 illustrates how the interrupted controller responds to this interrupt command. If the controller is not in its tracking state, it simply ignores the interrupt. This is the case if OK is not set (i.e., the controller is in its standby state), or if the controller is OK and selected (i.e., the controller is in its on-control state). If the on-control controller is not OK, the interrupt is also ignored. This situation would arise only if the on-control unit went bad between the time it initiated the interrupt command and the time the interrupted controller responds to the interrupt. Because the data may well be corrupted, the interrupted controller will not accept the data base under these circumstances. During the next control cycle, the interrupted controller will clearly read that the other controller is not OK and hence will institute a switchover. Finally if the on-control unit is OK, the interrupted controller updates its data base with the contents of the data buffer.

Although a preferred embodiment of the present invention has been set forth in detail above, it is understood that this is solely for the purposes of illustration and is thus not to be construed as limiting because many obvious modifications to this embodiment will become apparent to those of skill in the art.

I claim:
1. A process control system comprising:
 at least two digital controllers each with its own central processor and data storage means and capable of exercising direct digital control over the process;
 means for selecting one of said controllers to be on control and the other controller to be a backup controller;
 buffer memory means connected in series and in electrical communication with each of said controllers so as to decouple the respective data storage means of said controllers;

means operable with said one controller for periodically transferring the data base of said one controller to said buffer memory means;

means operable with said other controller for reading the previously entered contents of said buffer memory means and for subsequently entering said contents into its data storage means before the next data base is entered into said buffer memory means so that said other controller tracks said one controller with a delayed copy of said data base; and means for initiating automatic switchover to said other controller in the event of failure of said one controller, whereby the static and dynamic state of control is preserved.

2. The system of claim 1 wherein transfer of said data base occurs once during each control cycle of said controllers.

3. The system of claim 2 including means for resolving contention between said controllers for access to said buffer memory means such that only one of said controllers can be performing an operation with respect to said buffer memory means.

4. The system of claim 1 wherein said other controller includes means for assessing the operational status of said one controller before deciding to accept the data base stored in said buffer memory means.

5. The system of claim 4 further including means for inhibiting the transfer of said data base to said other controller when indication occurs of the failure of said one controller, thereby substantially reducing the likelihood of a failure within said one controller from corrupting the data base of said other controller.

6. A method of providing enhanced control security within an industrial process control system comprising the steps of:

selecting one of at least two controllers to be on control and the other to be on backup;

providing a periodic transfer of the data base of said one controller into a separate buffer memory that is serially connected between said controllers such that each shares access to said buffer memory so as to isolate individual data storage means in each of said controllers;

transferring said data base from said buffer memory to data storage means within the other controller within the interim between said periodic transfer, whereby said other controller is given a delayed copy of said data base;

tracking said one controller with said other controller while said other controller is on backup; and initiating a switchover of control to said other controller in the event of failure of said one controller.

7. A method as set forth in claim 6 including the step of deciding to accept said data base within said other controller depending upon the status of said one controller.

8. A method as set forth in claim 7 including the further step of inhibiting the transfer of said data base to said other controller if said one controller exhibits an undesirable pre-established condition, thereby substantially reducing the likelihood of a failure within said one controller from corrupting the data base of said other controller.

9. A process control system comprising:

two digital controllers each with its own central processor and data storage means and capable of exercising direct digital control over the process;

a director connected to both controllers for selecting one of the controllers to be on control and the other to be a backup controller;

a separate, externally located buffer memory in series electrical communication with each controller, said buffer memory being shared by said controllers thereby isolating the respective data storage means of the controllers;

means operable with said one controller for periodically transferring the most recent static and dynamic data base of said one controller to said buffer memory;

means operable with said last mentioned means for reading the entire data base presently stored in said buffer memory and for determining the status of said one controller before deciding to accept the data base stored in said buffer memory;

means for initiating automatic switchover to said other controller in the event of failure of said one controller; and means for inhibiting the transfer of said data base to said other controller if the status of said one controller is not OK, whereby the static and dynamic state of control is preserved.

10. The system of claim 9 wherein transfer of said data base occurs once during each control cycle of said controllers.

* * * * *